Patented Apr. 8, 1941

2,237,627

UNITED STATES PATENT OFFICE 2,237,627

SULPHURIZATION OF ORGANIC POLYSULPHIDES

John F. Olin, Grosse Ile, Mich., assignor to The Sharples Solvents Corporation, Philadelphia, Pa.

No Drawing. Application October 10, 1939, Serial No. 298,768

2 Claims. (Cl. 260—125)

This application is a continuation in part of my prior application, Serial Number 233,800, filed October 7, 1938, for Sulphurization of sulphur-containing organic compounds.

This invention relates to a process for sulphurizing organic compounds and is more particularly directed to the sulphurization of organic poly-sulphides.

During the past several years new and highly valuable uses have been found for organic compounds containing a relatively large percentage of sulphur or having sulphur to sulphur linkages in the molecule. Among the more important commercial developments of this nature are the compounding of extreme pressure lubricants and the acceleration of rubber treating processes. In both capacities di-, tri-, and other poly-sulphides of an organic nature are now generally recognized as materials of great and increasing commercial value.

The preparation of these compounds has, however, been a problem of considerable difficulty from the industrial standpoint. Recently, a process for the preparation of di-sulphides by the reaction between a hydrogen poly-sulphide and an olefin has been described in Letters Patent 2,061,018 to Wallace H. Carothers. This reaction gives satisfactory results in connection with those unsaturated aliphatic compounds having highly reactive multiple bonds, but is of relatively minor importance as a general method of preparation. An improvement on the Carothers technique is described in Letters Patent 2,061,019, issued to Carter and Downing. According to the latter process, the poly-sulphide of the Carothers reaction is formed in the reaction mixture by the action of hydrogen sulphide and sulphur on a basic substance. This is of course subject to the limitations of the earlier procedure and is not generally applicable.

It has now been found that aliphatic poly-sulphides in general may be synthesized by reacting sulphur with a mercaptan or poly-sulphide lower in sulphur content than that desired, in the presence of a catalyst of alkaline reaction. The process is applicable to the sulphurization of sulphur-containing compounds having a sulphur atom or sulphydryl radical attached to an alkyl, alicyclic, cyclic, or heterocyclic radical, except compounds in which a single sulphur atom is doubly linked directly to one or more such radicals, e. g., an alkyl mono-sulphide or thiophene. It involves the preparation of useful organic compounds of sulphur from relatively inexpensive raw materials.

The formation of compounds of the nature of di-alkyl di-sulphides from mercaptans is generally regarded as an oxidation reaction and prior to this invention has been caused by treatment with oxidizing agents such as oxygen bearing gases, acids and oxides of nitrogen, chlorates and the like. In view of the fact that the present invention provides a means to convert di-sulphides to tri-sulphides and tri-sulphides to tetrasulphides, etc., it is found advisable to use the term "sulphurization" to characterize the reaction involved. The novel reaction of this invention is achieved by reacting poly-sulphides with elemental sulphur in the presence of a very small amount of a basic catalyst.

Example I

Sulphurization of di-butyl di-sulphide.—To 242 g. of di-n-butyl di-sulphide and 75 g. of sulphur was added 5 cc. of mono-butyl amine. The mixture was refluxed for 15 minutes and upon filtration and distillation the reaction mass was found to contain:

(1) To 115° C. at 10 mm. (di-n-butyl di-sulphide) _____ g__ 96
(2) 115°–140° C. at 10 mm. (di-n-butyl tri-sulphide) _____ g__ 128
(3) Residue _____ g__ 80

Example II

Sulphurization of di-methyl di-sulphide.—100 g. of di-methyl di-sulphide, boiling between 115 and 120° C., and obtained by sulphurization of methyl mercaptan, are heated for eight hours at 100–120° C. with 32 g. of sulphur and 2 g. of 50% sodium hydrosulphide in alcohol. At the end of this time the product is washed with water, with dilute acetic acid, and again with water. Upon distillation of the reaction mixture up to 85° C. at 40 mm. pressure, unreacted di-methyl di-sulphide is obtained. The next cut, boiling between 60 and 70° C. at 18 mm. pressure consists of di-methyl tri-sulphide, which is a very pale, yellow colored, oil. The residue of the distillation is believed to be a mixture of di-methyl tetra-sulphide and sulphur.

Example III

Sulphurization of di-isopropyl di-sulphide.—300 g. of di-isopropyl di-sulphide, boiling between 80 and 90° C. at 25 mm. pressure, which has been obtained by the sulphurization of isopropyl mercaptan, are treated with 64 g. of sulphur and one cc. of tri-butyl amine at 125° C. for 8 hours. After washing, as in Example II, the reaction mixture is distilled. Di-isopropyl di-sulphide, is obtained in the cut boiling up to 105° C. at 25 mm. The second cut, boiling between 105 and 125° C. at 25 mm. pressure, consists principally of di-isopropyl tri-sulphide. The residue in the distilling flask is believed to be higher di-isopropyl sulphides and sulphur.

*Example IV*

*Sulphurization of di-tertiary butyl di-sulphide.*—356 g. of di-tertiary butyl di-sulphide, obtained by the sulphurization of tertiary butyl mercaptan, are treated at 125° C. for a period of 8 hours with 64 g. of sulphur and 5 cc. of di-amyl amine. After washing the reaction product as in Examples II and III, the product is vacuum distilled, as in those examples. Unchanged di-tertiary butyl di-sulphide is recovered in the cut boiling up to 100° C. under 10 mm. pressure. A second cut, consisting of di-tertiary butyl tri-sulphide, is recovered between 100 and 112° C. at 10 mm. pressure. It was a yellow oil. A third cut, likewise a yellow oil consisting principally of di-tertiary butyl tetrasulphide, is obtained as a fraction boiling between 130 and 145° C. at 10 mm. pressure. The residue in the distilling flask consists of higher sulphides together with some elemental sulphur.

The catalysts suited to the purposes of this invention include those compounds having an alkaline reaction such as oxides and hydroxides of the metals, alkali metal sulphides, ammonia, amines, etc., but the amines are preferred because of their solubility in the reaction mixtures. It has been found that the aryl amines, such as aniline, are operative for the present purpose, as well as the aliphatic amines such as those described in the specific examples given above. Temperature apparently may vary over a wide range, but sulphurization of poly-sulphides usually proceeds more rapidly at elevated temperatures. Pressure is unnecessary and the hydrogen sulphide formed by the reaction may be permitted to escape without adverse effect. This latter factor and the small amounts of catalyst employed clearly indicate that the present reaction is different in nature from previous processes using similar catalysts for the preparation of poly-sulphides from olefins.

Modifications will be obvious to those skilled in the art and I do not therefore wish to be limited except by the scope of the sub-joined claims.

I claim:

1. The process which comprises reacting a compound of the type $$R-S-S-R'$$

wherein R and R' are radicals chosen from the class consisting of aliphatic, alicyclic, aromatic and heterocyclic groups and S denotes sulphur, with sulphur in the presence of a catalytic amount of a basic catalyst.

2. The process which comprises reacting a compound of the type $$R-S-S-R'$$

wherein R and R' are radicals chosen from the class consisting of aliphatic, alicyclic, aromatic and heterocyclic groups and S denotes sulphur, with sulphur in the presence of a catalytic amount of an amine.

JOHN F. OLIN.